(12) United States Patent
Shi

(10) Patent No.: US 12,200,624 B2
(45) Date of Patent: Jan. 14, 2025

(54) METHOD FOR CONTROLLING DISCONTINUOUS RECEPTION-ONDURATION TIMER, TERMINAL DEVICE AND CHIP

(71) Applicant: GUANGDONG OPPO MOBILE TELECOMMUNICATIONS CORP., LTD., Guangdong (CN)

(72) Inventor: Cong Shi, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 331 days.

(21) Appl. No.: 17/831,412

(22) Filed: Jun. 2, 2022

(65) Prior Publication Data

US 2022/0295402 A1    Sep. 15, 2022

Related U.S. Application Data

(63) Continuation of application No. PCT/CN2019/124110, filed on Dec. 9, 2019.

(51) Int. Cl.
    *H04W 52/02*  (2009.01)
    *H04W 72/044*  (2023.01)
    *H04W 72/23*  (2023.01)

(52) U.S. Cl.
    CPC ..... *H04W 52/0232* (2013.01); *H04W 72/044* (2013.01); *H04W 72/23* (2023.01)

(58) Field of Classification Search
    CPC .......... H04W 52/0232; H04W 72/23; H04W 72/044
    See application file for complete search history.

(56) References Cited

U.S. PATENT DOCUMENTS

| 2019/0215847 | A1  | 7/2019 | Abdoli |
| 2019/0281652 | A1  | 9/2019 | Zhang et al. |
| 2019/0297577 | A1  | 9/2019 | Lin et al. |
| 2021/0105722 | A1* | 4/2021 | Tsai ................. H04W 52/0229 |
| 2022/0210773 | A1* | 6/2022 | Zhong .................. H04W 76/28 |

FOREIGN PATENT DOCUMENTS

| CN | 109496445 A | 3/2019 |
| CN | 110337830 A | 10/2019 |
| CN | 110519853 A | 11/2019 |

OTHER PUBLICATIONS

Second Office Action of the European application No. 19956022.8, issued on Jan. 23, 2024. 7 pages.

(Continued)

*Primary Examiner* — Erika A Washington
(74) *Attorney, Agent, or Firm* — PERKINS COIE LLP

(57) ABSTRACT

A method for monitoring a wake-up signal (WUS) and a terminal device are provided. The method comprises: in a case where a terminal device is switched from a source band width part (BWP) to a target BWP, the terminal device determining, according to a monitoring result for a WUS on the source BWP and/or a monitoring result for a WUS on the target BWP, whether to start an onduration timer at a starting time of the onduration timer on the target BWP.

18 Claims, 10 Drawing Sheets

In response to switching of a terminal device from a source BWP to a target BWP, the terminal device determines whether to start an onduration timer at a starting time of the onduration timer on the target BWP according to at least one of a monitoring result for a WUS on the source BWP or a monitoring result for a WUS on the target BWP — S201

(56) References Cited

OTHER PUBLICATIONS

Xiaomi Communications: "Discussion on PDCCH-WUS missing problems during BWP switching and handover", 3GPP Draft; R2-1916295, vol. RAN WG2, No. Reno, Nevada, US; Nov. 18, 2019-Nov. 22, 2019 Nov. 18, 2019 (Nov. 18, 2019), XP051826013. the whole document. 3 pages.
Second Office Action of the Chinese application No. 202210986506.9, issued on Nov. 10, 2023. 10 pages with English translation.
Reject Decision of the Chinese application No. 202210986506.9, issued on Jan. 23, 2024. 10 pages with English translation.
First Office Action of the European application No. 19956022.8, issued on Jul. 17, 2023. 5 pages.
First Office Action of the Chinese application No. 202210986506.9, issued on Aug. 16, 2023. 12 pages with English translation.
Session Chair (Interdigital): "Report for NR-U, Power Savings, NTN and 2-step RACH", 3GPP Draft; R2-1916284, Nov. 23, 2019 (Nov. 23, 2019), XP051828811. 37 pages.
Supplementary European Search Report for European application No. 19956022.8 mailed Oct. 17, 2022. 7 pages.
Written Opinion of the International Search Authority in the international application No. PCT/CN2019/124110, mailed on Aug. 31, 2020. 6 pages with English translation.
CATT, "Remaining issues of PDCCH-WUS", 3GPP TSG-RAN WG2 Meeting #108 R2-1914524, Reno, USA, Nov. 18-22, 2019.
International Search Report in the international application No. PCT/CN2019/124110, mailed on Aug. 31, 2020.

* cited by examiner

In response to switching of a terminal device from a source BWP to a target BWP, the terminal device determines whether to start an onduration timer at a starting time of the onduration timer on the target BWP according to at least one of a monitoring result for a WUS on the source BWP or a monitoring result for a WUS on the target BWP ⟋ S201

FIG. 3

METHOD FOR CONTROLLING DISCONTINUOUS RECEPTION-ONDURATION TIMER, TERMINAL DEVICE AND CHIP

CROSS-REFERENCE TO RELATED APPLICATIONS

This is a continuation application of International Patent Application No. PCT/CN2019/124110, filed on Dec. 9, 2019, the disclosure of which is hereby incorporated by reference in its entirety.

BACKGROUND

In the related art, how to control the discontinuous reception-onduration timer (DRX-onDuration Timer) has not been proposed for the scenario of Band Width Part (BWP) switching.

SUMMARY

The present application relates to the field of wireless communication technologies, and particularly to a method for controlling a discontinuous reception-onDuration timer, a terminal device and a chip.

The embodiments of the present disclosure provide a method for controlling a discontinuous reception-onduration timer, a terminal device, and a chip, which define how to control the DRX-onDuration Timer in the scenario of BWP switching.

A first aspect of the embodiments of the present disclosure provides a method for controlling a discontinuous reception-onduration timer. The method includes an operation as follows. In response to switching of a terminal device from a source BWP to a target BWP, the terminal device determines whether to start an onduration timer at an onduration timer start time on the target BWP according to at least one of a monitoring result for a wake-up signal (WUS) on the source BWP or a monitoring result for a WUS on the target BWP.

A second aspect of the embodiments of the present disclosure provides a terminal device. The terminal device includes a processor and a memory for storing a computer program executable by the processor. The processor is configured to run the computer program to, in response to switching of the terminal device from a source BWP to a target BWP, determine whether to start an onduration timer at an onduration timer start time on the target BWP according to at least one of a monitoring result for a WUS on the source BWP or a monitoring result for a WUS on the target BWP.

A third aspect of the embodiments of the present disclosure provides a chip including a processor configured to invoke and execute a computer program in a memory, to cause a device installed with the chip to perform the above-mentioned method for controlling the discontinuous reception-onduration timer executed by the terminal device.

BRIEF DESCRIPTION OF THE DRAWINGS

FIG. 3 is a schematic diagram of an optional process flow of a method for controlling a discontinuous reception-onduration timer according to an embodiment of the present disclosure.

DETAILED DESCRIPTION

Figure 1:
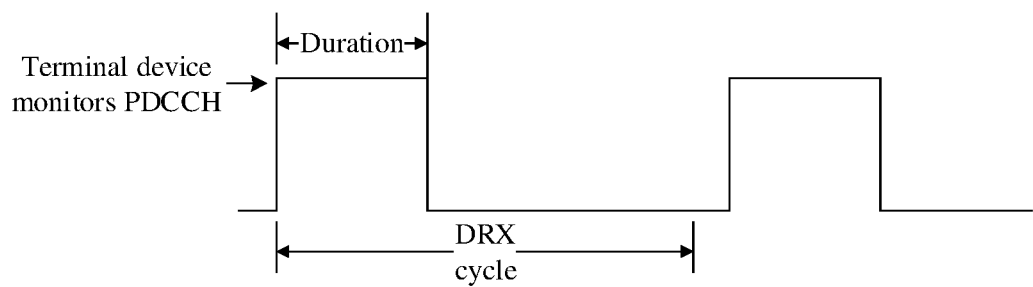
FIG. 1 is a schematic diagram showing that a terminal device monitors a downlink control channel.

In order to understand the features and technical contents of the embodiments of the present disclosure in more detail, implementations of the embodiments of the present disclosure are described in detail below with reference to the drawings, which are for reference only and are not intended to limit the embodiments of the present disclosure.

Prior to describing the method for controlling a discontinuous reception-onduration timer provided in the embodiments of the present disclosure, DRX in a New Radio (NR) system is briefly described.

In the NR system, the network device may configure a DRX function for the terminal device, and the terminal device discontinuously monitors a Physical Downlink Control Channel (PDCCH), thereby achieving the purpose of saving power of the terminal device. Each Medium Access Control (MAC) entity has a DRX configuration. The DRX configuration parameters include the following contents.

1) DRX-onDuration Timer indicates a duration during which the terminal device wakes up at the beginning of a DRX cycle.

2) DRX-SlotOffset indicates a delay for the terminal device to start the DRX-onDuration Timer.

3) DRX-InactivityTimer indicates a duration during which the terminal device continues monitoring a PDCCH after the terminal device receives the PDCCH indicating an uplink initial transmission or a downlink initial transmission.

4) DRX-RetransmissionTimerDL indicates a maximum duration during which the terminal device monitors a PDCCH indicating a downlink retransmission scheduling. Each downlink Hybrid Automatic Repeat reQuest (HARQ)

process other than a broadcasted HARQ process corresponds to one DRX-RetransmissionTimerDL.

5) DRX-RetransmissionTimerUL indicates a maximum duration during which the terminal device monitors a PDCCH indicating an uplink retransmission scheduling. Each uplink HARQ process corresponds to one DRX-RetransmissionTimerUL.

6) DRX-LongCycleStartOffset is used for configuring long DTX cycle, and an offset of starting subframes of the long DRX cycle and a short DRX cycle.

7) DRX-ShortCycle is an optional configuration.

8) DRX-ShortCycleTimer indicates a duration that the terminal device is in short DRX cycle (and no PDCCH is received), and is an optional configuration.

9) DRX-HARQ-RTT-TimerDL indicates a minimum waiting time that the terminal device expects to receive a PDCCH indicating downlink scheduling. Each downlink HARQ process other than the broadcasted HARQ process corresponds to one DRX-HARQ-RTT-TimerDL.

10) DRX-HARQ-RTT-TimerUL indicates a minimum waiting time that the terminal device expects to receive a PDCCH indicating uplink scheduling. Each uplink HARQ process corresponds to one DRX-HARQ-RTT-TimerUL.

If the terminal device is configured with DRX, the terminal device needs to monitor a PDCCH at a DRX Active Time. The DRX Active Time includes the following cases.

1) Any one of the following five timers is running a DRX-onDurationTimer, a

DRX-InactivityTimer, a DRX-RetransmissionTimerDL, a DRX-RetransmissionTimerUL, and a ra-ContentionResolutionTimer.

2) A Scheduling Request (SR) is sent on the PUCCH and is in a pending state.

3) In a contention-based random access procedure, the terminal device has not received an initial transmission indicated by a PDCCH scrambled by a Cell Radio Network Temporary Identifier (C-RNTI) yet after successfully receiving a random access response.

The terminal device may determine the time of starting the DRX-onDurationTimer according to whether the terminal device is currently in the short DRX cycle or the long DRX cycle, for example:

1) if the short DRX Cycle is used and the current subframe satisfies [(SFN×10)+subframe number] modulo (drx-ShortCycle)=(drx-StartOffset) modulo (drx-ShortCycle), the DRX-onDurationTimer is started;

2) If the long DRX Cycle is used and the current subframe satisfies [(SFN×10)+subframe number] modulo (drx-LongCycle)=drx-StartOffset, the DRX-onDurationTimer is started at a time after drx-SlotOffset slots from the beginning of the current subframe.

A schematic diagram showing a terminal device monitoring a PDCCH is as shown in FIG. 1, the terminal device monitors the PDCCH during a DRX on Duration.

In order to provide a larger data transmission rate and improve the user experience, the 5G system further increases the system bandwidth on the basis of the 4G system. In the 5G system, a maximum bandwidth supported by a single carrier is 100 MHz for a band below 6 GHz; a maximum bandwidth supported by a single carrier is 400 MHz for a band above 6 GHz. For a large carrier bandwidth, such as 100HMz, the bandwidth to be used by the terminal device is often very limited. If the terminal device detects and measures on the entire bandwidth at all times, it will bring great challenges to the terminal device in terms of the power consumption, which does not facilitate the power saving of the terminal device. Therefore, a BWP is introduced in the 5G system. That is, a part of the continuous bandwidth is separated from the entire large-bandwidth carrier for the terminal device for sending and receiving data. The terminal device only performs related operations within the part of the bandwidth configured by the network device, thereby achieving power saving of the terminal.

Based on the stipulation of the NR Rel-15 standard, for each serving cell of the terminal device, the network device may configure one or more BWPs for the terminal device on the serving cell through Radio Resource Control (RRC) signaling, and the maximum number of configurable BWPs is four. At each moment, the terminal device can only have one active downlink BWP and one active uplink BWP on the serving cell. The terminal device can only send and receive data on the active BWP. Considering the diversity of terminal services and the difference between different service characteristics, there is a requirement for the terminal device to regulate the BWP. For example, when a high-rate service is required due to a large amount of traffic, a BWP with a large bandwidth should be used for data transmission for the terminal device. When the traffic is small, a small bandwidth BWP can be used for data transmission for the terminal device. Therefore, the active BWP of the terminal device on the serving cell can be changed by means of BWP switching. The BWP switching methods supported in the current standard include the following four BWP switching manners.

BWP Switching Based on PDCCH

The network device informs the terminal device of the target BWP for switching by sending a PDCCH to the terminal device.

2) BWP Switching Based on RRC (Re-) Configuration Message

The network device instructs the terminal device to switch the active BWP to the target BWP with the firstActiveDownlinkBWP-Id and/or the firstActiveUplinkBWP-Id by carrying the firstActiveDownlinkBWP-Id and/or the firstActiveUplinkBWP-Id in the RRC (re-) configuration message.

3) BWP Switching Based on Timeout of the Timer

The BWP switching based on timeout of the timer is an implicit mode. The network device configures a timer bwp-InactivityTimer for each serving cell of the terminal device. If the currently active downlink BWP for the terminal device is a BWP other than the default BWP and the initial BWP, each time the terminal device receives, on the currently active BWP, a PDCCH indicating the uplink or downlink scheduling to the terminal device, or receives a PDCCH that instructs the terminal device to perform the uplink or downlink scheduling on the currently active BWP, the timer bwp-InactivityTimer is started or restarted. If timer bwp-InactivityTimer expires, the terminal device automatically switches to the default BWP or the initial BWP. Both default BWP and the initial BWP are determined by the RRC configuration.

4) BWP Switching Caused by Random Access Initialization

During RACH initialization process, the following operations are performed.

If the terminal device is not configured with a Physical Random Access Channel (PRACH) occasion on the currently active uplink BWP, the terminal device automatically switches the uplink BWP to the initial uplink BWP. If the serving cell of the terminal device is a special Cell (SpCell), the terminal device switches the downlink BWP to the initial downlink BWP while switching the uplink BWP to the initial uplink BWP.

If the terminal device is configured with the PRACH occasion on the currently active uplink BWP, and the serving cell for the terminal device is the SpCell, and a bwp-Id of the currently active downlink BWP for the terminal device is different from a bwp-Id of the active uplink BWP for the terminal device, the terminal device switches to a downlink BWP with the same bwp-Id as the currently active uplink BWP.

In the NR Rel-16 version, a wake-up signal (WakeUpSignal, WUS) is introduced in the DRX for the terminal device in a connected state, and the WUS is designed based on the PDCCH. The terminal device starts monitoring the WUS at the WUS monitoring occasion at a configured offset time before a starting time of the DRX-onDurationTimer. The terminal device determines whether to start the DRX-onDurationTimer at the subsequent starting time of the DRX-onDurationTimer according to an indication in the WUS. If no WUS is monitored by the terminal device, the DRX-onDurationTimer is started by default.

The BWP switching may occur in the process of monitoring the WUS. For the BWP switching based on the timer, the terminal device can predict that the BWP switching occurs during the WUS monitoring occasion, and thus the terminal device may not monitor the WUS and start the DRX-onDurationTimer. For the BWP switching triggered by RACH, the terminal device cannot accurately predict when the RACH triggers, and the terminal device may be monitoring at the WUS monitoring occasion. In this case, how to monitor the WUS on the source BWP before the BWP switching is described as follows.

If the monitoring on a part of the WUS monitoring occasion of the source BWP indicates that the terminal device does not start the DRX-onDurationTimer, the terminal device does not start the DRX-onDurationTimer on the target BWP after the switching, so as to save the power of the terminal device.

However, a complete WUS monitoring occasion on the source BWP has been monitored before the BWP switching. If a monitoring result for the complete WUS monitoring occasion on the target BWP is identical with the monitoring result for the complete WUS monitoring occasion on the source BWP, how the terminal device controls the DRX-onDurationTimer has not been defined.

The embodiments of the present disclosure provide a method for controlling a discontinuous reception-onDuration timer. The method for controlling a discontinuous reception-onDuration timer according to the embodiments of the present disclosure may be applied to various communication systems. For example, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, an Advanced Long Term Evolution (LTE-A) system, a New Radio (NR) system, an evolved system of the NR system, an LTE-based access to Unlicensed spectrum (LTE-U) system, an NR-based access to Unlicensed spectrum (NR-U) system, a Universal Mobile Telecommunication System (UMTS), a Worldwide Interoperability for Microwave Access (WiMAX) communication system, a Wireless Local Area Network (WLAN), a Wireless Fidelity (WiFi), a next generation communication system, or other communication system.

In general, the number of connections supported by conventional communication systems is limited and easy to implement. However, with the development of communication technologies, mobile communication systems can support not only the conventional communication, but also, for example, Device-to-Device (D2D) communication, Machine-to-Machine (M2M) communication, Machine Type Communication (MTC), and Vehicle to Vehicle (V2V) communication, and the like. The embodiments of the present disclosure can also be applied to these communication systems.

The system architecture and the service scenarios described in the embodiments of the present disclosure are intended to describe the technical solutions of the embodiments of the present disclosure clearly, and do not constitute a limitation to the technical solutions provided by the embodiments of the present disclosure. A person of ordinary skill in the art can appreciate that the technical solutions provided in the embodiments of the present disclosure are also applicable to similar technical problems with the evolution of the network architecture and the emergence of new service scenarios.

The network device in the embodiments of the present disclosure may be a common base station (e.g., a NodeB or an eNB or a gNB), a new radio controller (NR controller), a centralized unit, a new radio base station, a radio remote unit, a micro base station, a relay, a distributed unit, a transmission reception point (TRP), a transmission point (TP) or any other device. Specific technologies and specific device forms used by the network device is not limited in the embodiments of the present disclosure. For convenience of description, the above-described device that provides the wireless communication function for the terminal device is collectively referred to as a network device in all embodiments of the present disclosure.

In the embodiments of the present disclosure, the terminal device may be any terminal. For example, the terminal device may be a user device for machine type communication. That is, the terminal device may also be referred to as a user equipment, a mobile station (MS), a mobile terminal, a terminal, etc., and the terminal device may communicate with one or more core networks via a radio access network. For example, the terminal device may be a mobile telephone (or referred to as a "cellular" telephone), a computer having a mobile terminal, etc. For example, the terminal device may also be a portable, pocket-sized, handheld, computer built-in or in-vehicle mobile device, which exchanges language and/or data with the radio access network. There is no specific limitation in the embodiments of the present disclosure.

Optionally, the network device and the terminal device may be arranged on land, including indoors or outdoors, may be handheld or in-vehicle, or may also be arranged on water, on an airplane, a balloon and a satellite in the air. The application scenarios of the network device and the terminal device are not limited in the embodiments of the present disclosure.

Optionally, the communication between the network device and the terminal device and the communication between the terminal device and the terminal device may be performed on a licensed spectrum, or on an unlicensed spectrum, or both a licensed spectrum and an unlicensed spectrum. The communication between the network device and the terminal device and the communication between the terminal device and the terminal device may be performed through a spectrum below 7 gigahertz (GHz), or a spectrum above 7 GHz, or both a spectrum below 7 GHz and a spectrum above 7 GHz. The embodiments of the present disclosure do not limit the spectrum resources used between the network device and the terminal device.

The number of connections supported by conventional communication systems is limited and easy to implement.

However, with the development of communication technologies, mobile communication systems can support not only conventional communication, but also, for example, Device-to-Device (D2D) communication, Machine-to-Machine (M2M) communication, Machine Type Communication (MTC), and Vehicle to Vehicle (V2V) communication, and the like. The embodiments of the present disclosure can also be applied to these communication systems.

Figure 2:
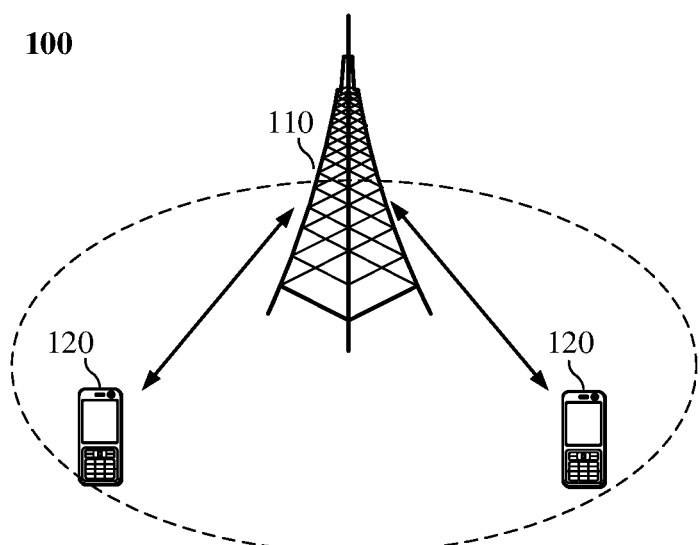
FIG. 2 is a schematic structural diagram of a communication system according to an embodiment of the present disclosure.

Exemplarily, a communication system 100 to which the embodiment of the present disclosure is applied is illustrated in FIG. 2. The communication system 100 may include a network device 110, which may be a device that communicates with a terminal device 120 (or referred to as a communication terminal, a terminal). The network device 110 may provide communication coverage for a particular geographic area and may communicate with terminal devices located within the coverage. Alternatively, the network device 110 may be a Base Transceiver Station (BTS) in a GSM system or a CDMA system, may be a NodeB (NB) in a WCDMA system, may be an Evolutional Node B (eNB or eNodeB) in an LTE system, or may be a radio controller in a Cloud Radio Access Network (CRAN), or may be a mobile switching center, a relay station, an access point, an in-vehicle device, a wearable device, a hub, a switch, a bridge, a router, a network-side device in the 5G network, a network device in a future evolved Public Land Mobile Network (PLMN), or the like.

The communication system 100 further includes at least one terminal device 120 within the coverage of the network device 110. As used herein, the "terminal device" includes, but is not limited to be connected via a wired line, such as via a Public Switched Telephone Networks (PSTN), a Digital Subscriber Line (DSL), a digital cable, a direct cable connection, and/or another data connection/network, and/or via a wireless interface, for example, for a cellular network, a Wireless Local Area Network (WLAN), a digital television network such as a DVB-H network, a satellite network, a AM-FM broadcast transmitter; and/or means of another terminal device configured to receive/transmit communication signals; and/or an Internet of Things (IoT) device. The terminal device configured to communicate through a wireless interface may be referred to as a "radio communication terminal", a "radio terminal" or a "mobile terminal". Examples of the mobile terminal include, but are not limited to: a satellite or cellular telephone; a Personal Communications System (PCS) terminal that may combine a cellular radio telephone with data processing, fax, and data communication capabilities; a Personal Digital Assistant (PDA) that may include a radio telephone, a pager, Internet/Intranet access, a Web browser, a notebook, a calendar, and/or a Global Positioning System (GPS) receiver; and conventional laptop and/or palmtop receivers or other electronic devices including radio telephone transceivers. The terminal device may refer to an access terminal, UE, a user unit, a user station, a mobile station, a mobile radio station, a remote station, a remote terminal, a mobile device, a user terminal, a terminal, a radio communication device, a user agent, or a user device. The access terminal may be a cellular telephone, a cordless telephone, a Session Initiation Protocol (SIP) telephone, a Wireless Local Loop (WLL) station, a PDA, a handheld device having a radio communication function, a computing device or other processing device connected to a radio modem, an in-vehicle device, a wearable device, a terminal device in the 5G network, a terminal device in the future evolved PLMN, or the like.

Optionally, Device to Device (D2D) communication may be performed between the terminal devices 120.

Optionally, the 5G system or the 5G network may also be referred to as an NR system or an NR network.

FIG. 2 exemplarily illustrates a network device and two terminal devices. Optionally, the communication system 100 may include a plurality of network devices and other numbers of terminal devices may be included within the coverage of each network device, which are not limited in the embodiments of the present disclosure.

Optionally, the communication system 100 may further include other network entities such as a network controller, a mobility management entity, which are not limited in the embodiments of the present disclosure.

It should be understood that a device having a communication function in a network/system in the embodiments of the present disclosure may be referred to as a communication device. As an example of the communication system 100 illustrated in FIG. 2, the communication device may include a network device 110 and a terminal device 120 having a communication function. The network device 110 and the terminal device 120 may be specific devices described above, which are not described herein repeatedly. The communication device may further include other devices in the communication system 100, such as network controllers, mobility management entities, and other network entities, which are not limited in the embodiments of the present disclosure.

As shown in FIG. 3, an optional process flow of a method for controlling a discontinuous reception-onDuration timer provided in an embodiment of the present disclosure includes an operation as follows.

At S201, in response to switching of a terminal device from a source BWP to a target BWP, the terminal device determines whether to start an onDuration timer at a starting time of the onDuration timer on the target BWP according to at least one of a monitoring result for a WUS on the source BWP or a monitoring result for a WUS on the target BWP.

In some alternative embodiments, the switching of the terminal device from the source BWP to the target BWP occurs within a WUS monitoring occasion on the target BWP.

Figure 4:
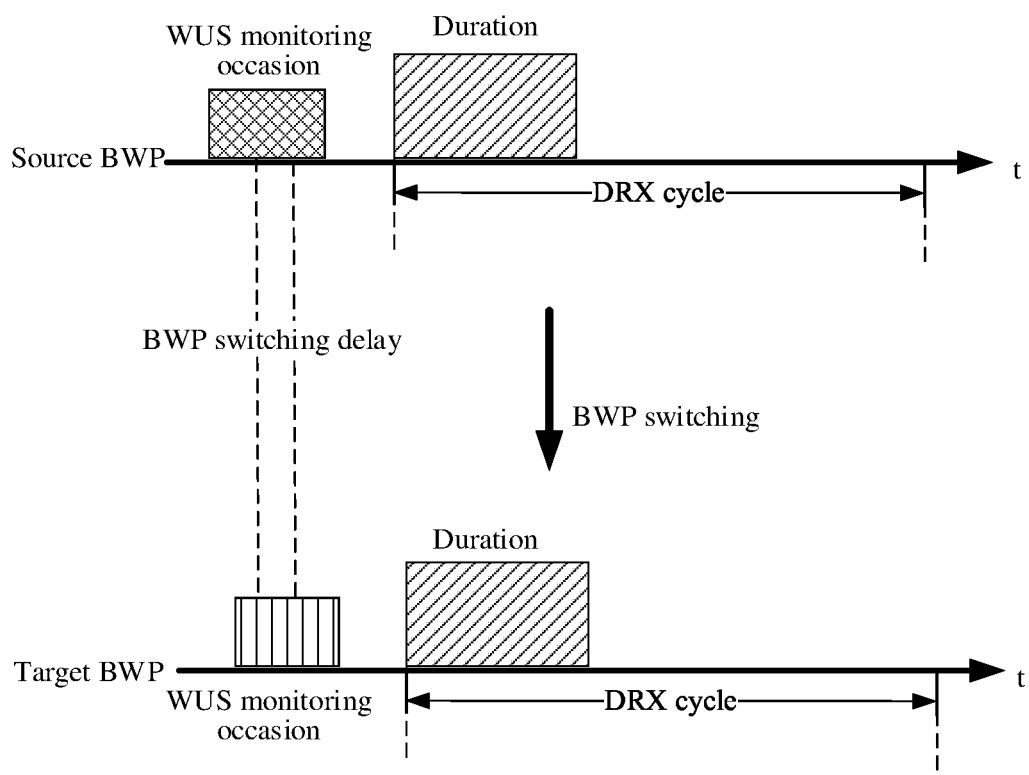
FIG. 4 is a schematic diagram showing that switching of a terminal device from a source BWP to a target BWP occurs within a monitoring occasion on the source BWP according to an embodiment of the present disclosure.
Figure 5:
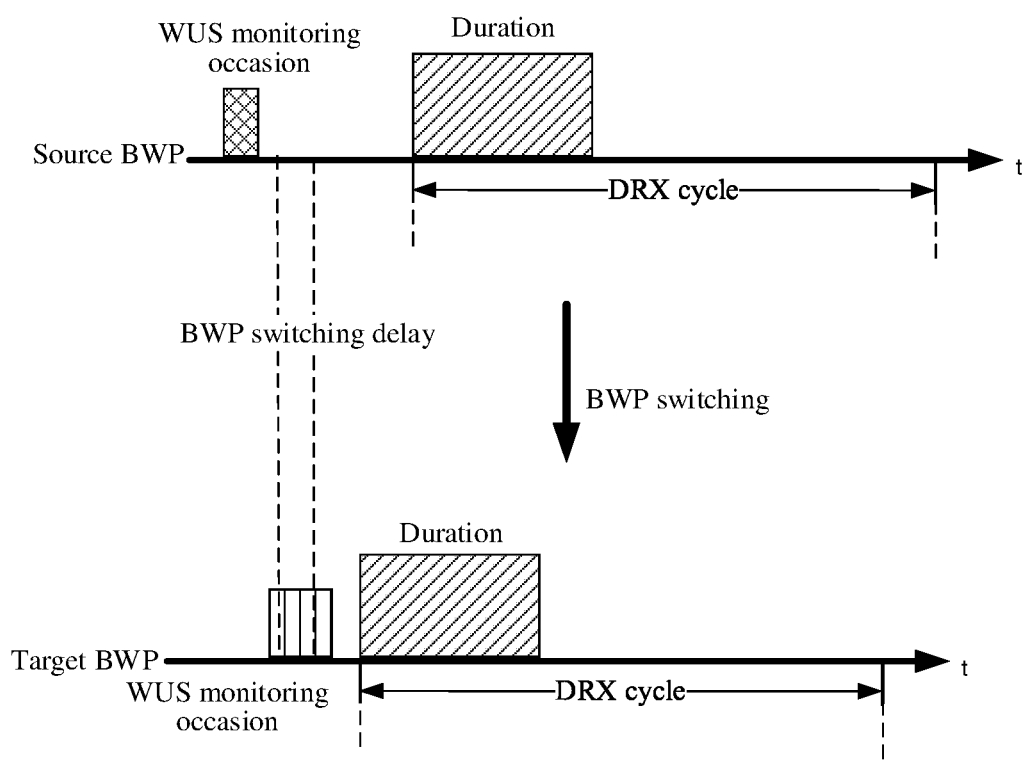
FIG. 5 is a schematic diagram showing that switching of a terminal device from a source BWP to a target BWP occurs after a complete monitoring occasion on the source BWP according to an embodiment of the present disclosure.

In some embodiments, in a scenario where the switching of the terminal device from the source BWP to the target BWP occurs within the WUS monitoring occasion of the target BWP, the switching of the terminal device from the source BWP to the target BWP may occur within the monitoring occasion of the source BWP, as shown in FIG. 4. The switching of the terminal device from the source BWP to the target BWP may also occur after a complete monitoring occasion of the source BWP, as shown in FIG. 5.

For the scenario where the switching of the terminal device from the source BWP to the target BWP occurs within the WUS monitoring occasion on the target BWP, the terminal device may not monitor the WUS on the target BWP, and the terminal device determines whether to start the onDuration timer at the starting time of the onDuration timer on the target BWP according to the WUS monitoring result on the source BWP.

According to the method for controlling a discontinuous reception-onduration timer provided in the embodiments of the present disclosure, in response to switching of a terminal device from a source BWP to a target BWP, the terminal device determines whether to start an onduration timer at a starting time of the onduration timer on the target BWP according to at least one of a monitoring result for a WUS on the source BWP or a monitoring result for a WUS on the target BWP. In this way, how the terminal device controls the DRX-onDuration Timer in the scenario in which the terminal device switches from the source BWP to the target BWP is defined.

How to control the onDuration timer on the target BWP according to different monitoring results for the WUS of the terminal device on the source BWP is described below.

In response to that a WUS is monitored by the terminal device on the source BWP, and the WUS instructs the terminal device to prohibit starting the onDuration timer, the terminal device determines not to start the onDuration timer at the starting time of the onDuration timer on the target BWP.

In response to that no WUS is monitored by the terminal device on the source BWP, the terminal device determines to start the onDuration timer at the starting time of the onDuration timer on the target BWP.

In response to that a WUS is monitored by the terminal device on the source BWP, and the WUS instructs the terminal device to start the onDuration timer, the terminal device determines to start the onDuration timer at the starting time of the onDuration timer on the target BWP.

In this way, for the scenario where the switching of the terminal device from the source BWP to the target BWP occurs within the WUS monitoring occasion of the target BWP, if a downlink BWP switching of the terminal device occurs within the WUS monitoring occasion of the source BWP, and the terminal device configures the WUS monitoring occasion the target BWP after the switching, the terminal device can determine whether to start the DRX-onDuration at the subsequent starting time of the DRX-onDuration according to the detection result for the WUS on the source BWP. In this way, the monitoring result for the WUS within partial WUS monitoring occasion of the source BWP can be used to determine whether to start the DRX-onDuration at the subsequent starting time of the DRX-onDuration, thereby saving the energy consumption of the terminal device.

In other alternative embodiments, the switching of the terminal device from the source BWP to the target BWP occurs before a WUS monitoring occasion on the target BWP.

Figure 6:
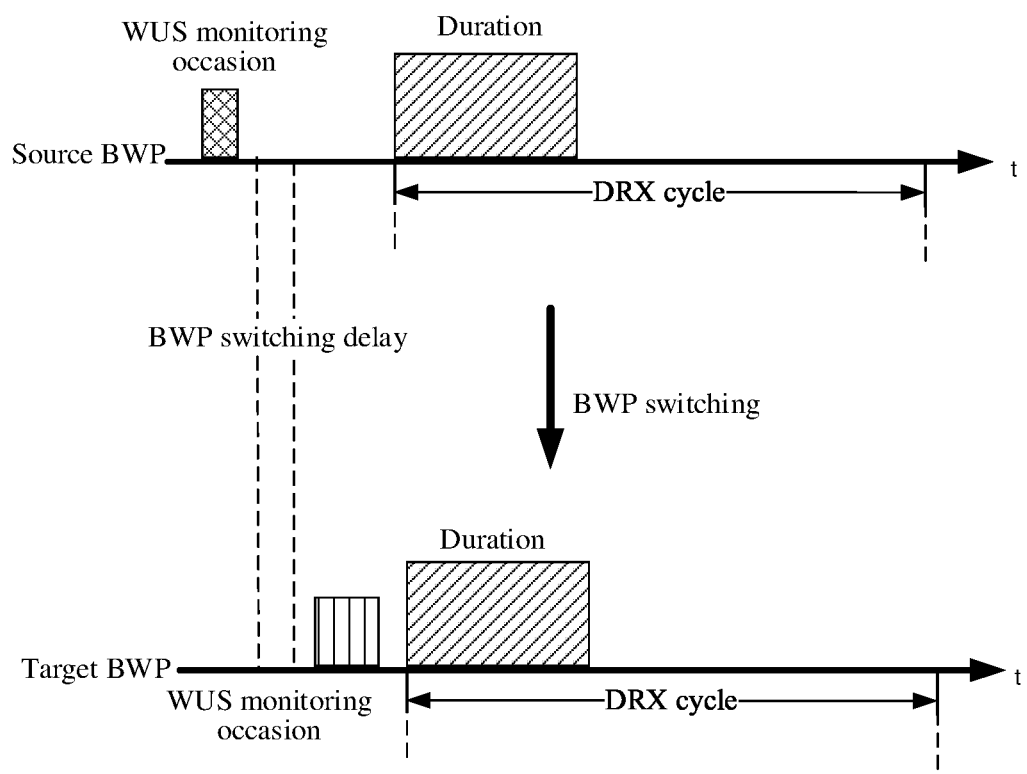
FIG. 6 is a schematic diagram showing that switching of a terminal device from a source BWP to a target BWP occurs after a complete monitoring occasion on the source BWP and before a monitoring occasion on the target BWP according to an embodiment of the present disclosure.
Figure 7:
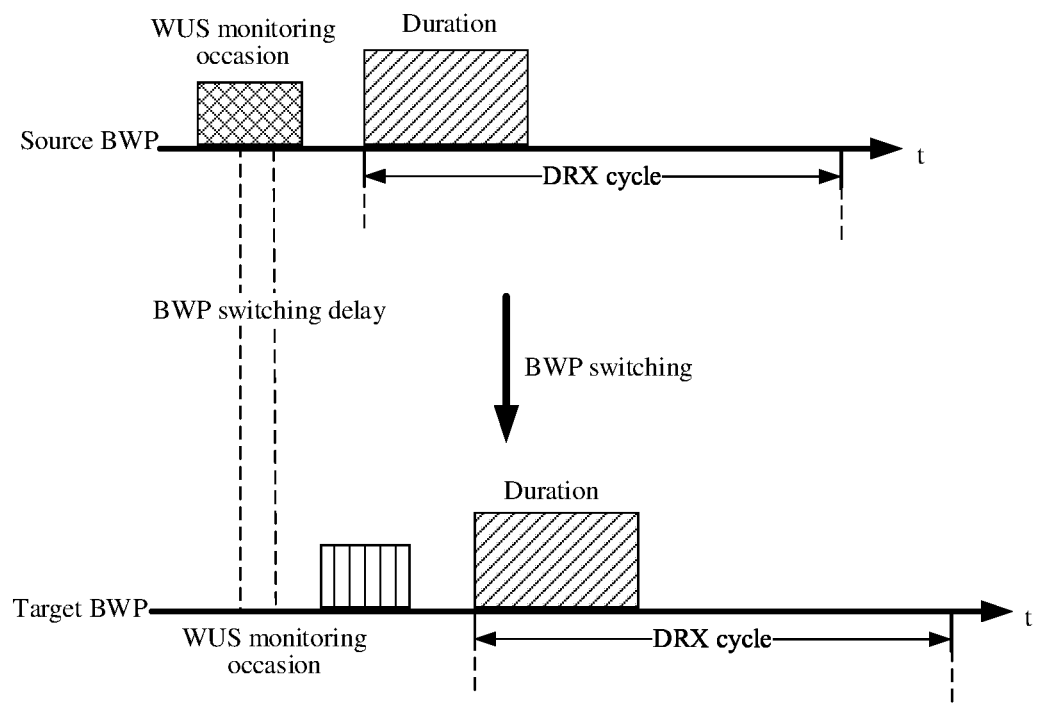
FIG. 7 is a schematic diagram showing that switching of a terminal device from a source BWP to a target BWP also occurs within a monitoring occasion on the source BWP and before a monitoring occasion on the target BWP according to an embodiment of the present disclosure.

In some embodiments, in the scenario where the switching of the terminal device from the source BWP to the target BWP occurs before the WUS monitoring occasion on the target BWP, the switching of the terminal device from the source BWP to the target BWP may occur after a complete monitoring occasion on the source BWP and before the monitoring occasion on the target BWP, as shown in FIG. 6. The switching of the terminal device from the source BWP to the target BWP may also occur within the monitoring occasion on the source BWP and before the monitoring occasion on the target BWP, as shown in FIG. 7.

For the scenario where the switching of the terminal device from the source BWP to the target BWP occurs before the WUS monitoring occasion on the target BWP, the terminal device may monitor the WUS on the target BWP, and the terminal device determines whether to start the onDuration timer at the starting time of the onDuration timer on the target BWP according to the monitoring result for the WUS on the source BWP and/or the target BWP.

How to control the onDuration timer on the target BWP in response to different monitoring results for the WUS of the terminal device on the source BWP and/or the target BWP is described.

In response to that a WUS is monitored by the terminal device on either one of the source BWP and the target BWP, and the WUS instructs the terminal device to start the onDuration timer, the terminal device determines to start the onDuration timer at the starting time of the onDuration timer on the target BWP.

For example, in response to that a WUS is monitored by the terminal device on the source BWP, and the WUS instructs the terminal device to start the onDuration timer, the terminal device determines to start the onDuration timer at the starting time of the onDuration timer on the target BWP, regardless of whether a WUS is monitored by the terminal device on the target BWP and whether the WUS monitored on the target BWP instructs the terminal device to start the onDuration timer. Similarly, in response to that a WUS is monitored by the terminal device on the target BWP, and the WUS instructs the terminal device to start the onDuration timer, the terminal device determines to start the onDuration timer at the starting time of the onDuration timer on the target BWP, regardless of whether a WUS is monitored by the terminal device on the source BWP, and whether the WUS monitored on the source BWP instructs the terminal device to start the onDuration timer.

In response to that no WUS is monitored by the terminal device on either one of the source BWP and the target BWP, and a network device configures the terminal device to start the onDuration timer when no WUS is monitored, the terminal device determines to start the onDuration timer at the starting time of the onDuration timer on the target BWP.

For example, in response to that no WUS is monitored by the terminal device on the source BWP, and the network device configures the terminal device to start the onDuration timer when no WUS is monitored, the terminal device determines to start the onDuration timer at the starting time of the onDuration timer on the target BWP, regardless of whether a WUS is monitored by the terminal device on the target BWP, and whether the WUS monitored on the target BWP instructs the terminal device to start the onDuration timer. Similarly, in response to that no WUS is monitored by the terminal device on the target BWP, and the network device configures the terminal device to start the onDuration timer when no WUS is monitored, the terminal device determines to start the onDuration timer at the starting time of the onDuration timer on the target BWP, regardless of whether a WUS is monitored by the terminal device on the source BWP, and whether the WUS monitored on the source BWP instructs the terminal device to start the onDuration timer.

In response to that no WUS is monitored on both of the source BWP and the target BWP, the terminal device may determine whether to start the onDuration timer at the starting time of the onDuration timer on the target BWP according to a configuration of a network device.

In some embodiments, in response to that the network device configures the terminal device to start the onDuration timer when no WUS is monitored, the terminal device determines to start the onDuration timer at the starting time of the onDuration timer on the target BWP.

Alternatively, in response to that the network device configures the terminal device to prohibit starting the onDuration timer when no WUS is monitored, the terminal device determines not to start the onDuration timer at the starting time of the onDuration timer on the target BWP.

In response to that a WUS is monitored on one of the source BWP and the target BWP, and the WUS instructs the terminal device to prohibit starting the onDuration timer, and no WUS is monitored on the other of the source BWP and the target BWP, the terminal device determines not to start the onDuration timer at the starting time of the onDuration timer on the target BWP.

For example, in response to that a WUS is monitored by the terminal device on the source BWP, and the WUS instructs the terminal device to prohibit starting the onDuration timer, and no WUS is monitored by the terminal device on the target BWP, the terminal device determines not to start the onDuration timer at the starting time of the onDuration timer on the target BWP. Similarly, in response to that a WUS is monitored on the target BWP, and the WUS instructs the terminal device to prohibit starting the onDuration timer, and no WUS is monitored by the terminal device on the source BWP, the terminal device determines not to start the onDuration timer at the starting time of the onDuration timer on the target BWP.

In response to that a WUS is monitored on one of the source BWP and the target BWP, the WUS instructs the terminal device to prohibit starting the onDuration timer, and monitoring for the WUS is not performed on the other of the source BWP and the target BWP, the terminal device determines not to start the onDuration timer at the starting time of the onDuration timer on the target BWP.

For example, in response to that a WUS is monitored by the terminal device on the source BWP, and the WUS instructs the terminal device to prohibit starting the onDuration timer, and monitoring for the WUS is not performed on the target BWP, the terminal device determines not to start the onDuration timer at the starting time of the onDuration timer on the target BWP. Similarly, in response to that a WUS is monitored by the terminal device on the target BWP, and the WUS instructs the terminal device to prohibit starting the onDuration timer, and no WUS is monitored by the terminal device on the source BWP, the terminal device determines not to start the onDuration timer at the starting time of the onDuration timer on the target BWP.

In this way, for the scenario where the switching of the terminal device from the source BWP to the target BWP occurs before the monitoring occasion for the WUS on the target BWP, the terminal device can use the monitoring results for the WUS of the two complete WUS monitoring occasions on the source BWP and the target BWP to determine whether to start the DRX-onDuration at the subsequent starting time of the DRX-onDuration, thereby avoiding missing the subsequent PDCCH scheduling for the terminal device by the network device as much as possible, and the transmission delay of the services.

Figure 8:
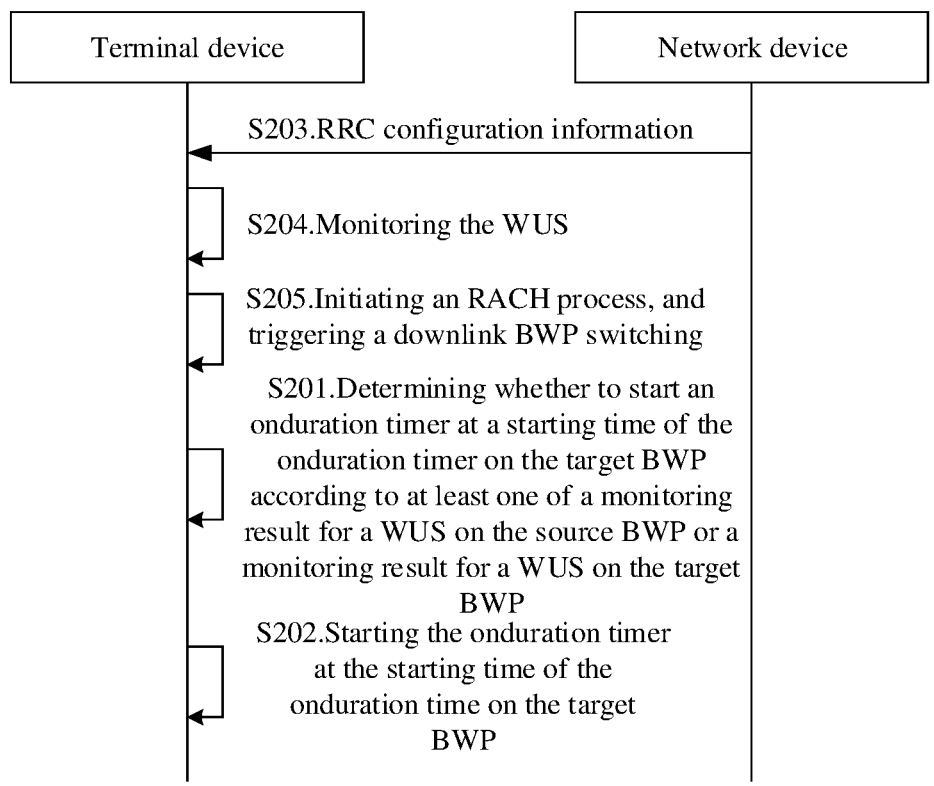
FIG. 8 is a schematic diagram of another optional process flow of a method for controlling a discontinuous reception-onduration timer according to an embodiment of the present disclosure.

As shown in FIG. 8, the method for controlling discontinuous reception-onDuration timer provided in the embodiment of the present disclosure may further include an operation as follows.

At S202, when the terminal device determines to start the onDuration timer at the starting time of the onDuration timer on the target BWP, the terminal device starts the onDuration timer at the starting time of the onDuration timer on the target BWP.

Before the operation S201, the method for controlling discontinuous reception-onDuration timer provided in the embodiment of the present disclosure may further include operations 203 to 205 as follows.

At S203, the terminal device receives RRC configuration information sent by the network device.

In some embodiments, the RRC configuration information is used to configure parameters of the DRX, parameters of the downlink BWP/uplink BWP, and parameters of the WUS.

Optionally, the parameters of the DRX may include a long DRX cycle, drx-onDurationTimer, etc.

The parameters of the downlink BWP may include one initialDownlinkBWP, and in addition, may include at least one downlink BWP, and configuration of bwp-InactivityTimer.

The parameters of the uplink BWP may include at least one uplink BWP in addition to the initialUplinkBWP.

The parameters of the WUS may include the WUS monitoring occasion on partial downlink BWP.

At S204, the terminal device monitors a WUS on a WUS monitoring occasion of a currently active downlink BWP based on the configuration of the network device.

At S205, the terminal device initiates an RACH process, and downlink BWP switching during the RACH initialization process.

In response to triggering the downlink BWP switching during the RACH initialization process, the terminal device may finish or not finish monitoring on the WUS monitoring occasion of the BWP (source BWP) before the switching.

It should be understood that, in the various embodiments of the present disclosure, the serial numbers of the above-mentioned operations does not mean an execution order and the execution order of each operation should be determined by the function and internal logic thereof, and should not constitute any limitation to the implementation process of the embodiments of the present disclosure.

Figure 9:
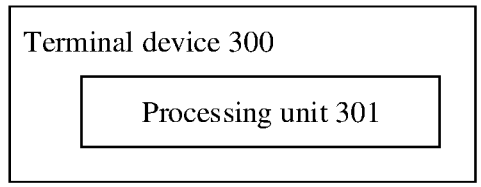
FIG. 9 is a schematic structural diagram of a terminal device according to an embodiment of the present disclosure.

In order to implement the method for controlling discontinuous reception-onDuration timer, the embodiments of the present disclosure further provide a terminal device. A schematic structural diagram of the terminal device 300 is shown in FIG. 9. The terminal device 300 includes a processing unit 301.

The processing unit 301 is configured to, in response to switching of the terminal device from a source Band Width Part (BWP) to a target BWP, determine whether to start an onDuration timer at the starting time of the onDuration timer on the target BWP according to at least one of a monitoring result for a wake-up signal (WUS) on the source BWP or a monitoring result for a WUS on the target BWP.

In some embodiments, the processing unit 301 is configured to, in response to that a WUS is monitored on the source BWP and the WUS instructs the terminal device to prohibit starting the onDuration timer, determine not to start the onDuration timer at the starting time of the onDuration timer on the target BWP.

In some embodiments, the processing unit 301 is configured to, in response to no WUS is monitored on the source BWP, determine to start the onDuration timer at the starting time of the onDuration timer on the target BWP.

In some embodiments, the processing unit 301 is configured to, in response to that a WUS is monitored on the source BWP and the WUS instructs the terminal device to start the onDuration timer, determine to start the onDuration timer at the starting time of the onDuration timer on the target BWP.

In some embodiments, the switching of the terminal device from the source BWP to the target BWP occurs within a WUS monitoring occasion on the target BWP.

In some embodiments, the processing unit 301 is configured to not monitor a WUS on the target BWP.

In some embodiments, the processing unit 301 is configured to, in response to that a WUS is monitored on either one of the source BWP and the target BWP, and the WUS instructs the terminal device to start the onDuration timer, determine to start the onDuration timer at the starting time of the onDuration timer on the target BWP.

In some embodiments, the processing unit 301 is configured to, in response to that no WUS is monitored on either one of the source BWP and the target BWP, and a network device configures the terminal device to start the onDuration timer when no WUS is monitored, determine to start the onDuration timer at the starting time of the onDuration timer on the target BWP.

In some embodiments, in response to that no WUS is monitored on both of the source BWP and the target BWP, the processing unit 301 is further configured to determine whether to start the onDuration timer at the starting time of the onDuration timer on the target BWP according to the configuration of the network device.

In some embodiments, the processing unit 301 is configured to: in response to that the network device configures the terminal device to start the onDuration timer when no WUS is monitored, determine to start the onDuration timer at the starting time of the onDuration timer on the target BWP.

Alternatively, in response to that the network device configures the terminal device to prohibit starting the onDuration timer when no WUS is monitored, determine not to start the onDuration timer at the starting time of the onDuration timer on the target BWP.

In some embodiments, the processing unit 301 is configured to: in response to that a WUS is monitored on one of the source BWP and the target BWP, and the WUS instructs the terminal device to prohibit starting the onDuration timer, and no WUS is monitored on the other of the source BWP and the target BWP, determine not to start the onDuration timer at the starting time of the onDuration timer on the target BWP.

Alternatively, the processing unit 301 is configured to: in response to that a WUS is monitored on one of the source BWP and the target BWP, the WUS instructs the terminal device to prohibit starting the onDuration timer, and monitoring for the WUS is not performed on the other of the source BWP and the target BWP, determine not to start the onDuration timer at the starting time of the onDuration timer on the target BWP.

In some embodiments, the switching of the terminal device from the source BWP to the target BWP occurs before a WUS monitoring occasion on the target BWP.

In some embodiments, the processing unit 301 is further configured to monitor a WUS on the target BWP.

In some embodiments, the processing unit 301 is further configured to start the onDuration timer at the starting time of the onDuration timer on the target BWP.

The embodiments of the present disclosure further provide a terminal device including a processor and a memory for storing a computer program executable by the processor. The processor is configured to run the computer program to the operations of the above-mentioned method for controlling the discontinuous reception-onDuration timer executed by the terminal device.

The embodiments of the present disclosure further provide a chip including a processor configured to invoke and execute a computer program in a memory, to cause a device installed with the chip to perform the above-mentioned method for controlling the discontinuous reception-onDuration timer executed by the terminal device.

The embodiments of the present disclosure further provide a storage medium having stored thereon an executable program that, when executed by a processor, implements the above-mentioned method for controlling the discontinuous reception-onDuration timer executed by the terminal device.

The embodiments of the present disclosure further provide a computer program product including computer program instructions that cause a computer to perform the above-mentioned method for controlling the discontinuous reception-onDuration timer executed by the terminal device.

The embodiments of the present disclosure further provide a computer program causing a computer to perform the above-mentioned method for controlling the discontinuous reception-onDuration timer executed by the terminal device.

Figure 10:
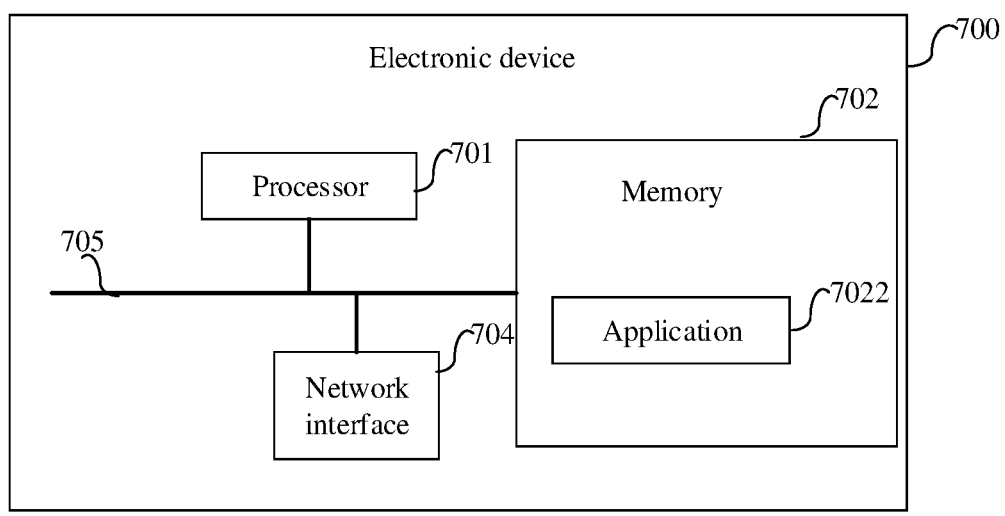
FIG. 10 is a schematic structural diagram of hardware of an electronic device according to an embodiment of the present disclosure.

FIG. 10 is a schematic diagram of a hardware structure of an electronic device (terminal device) according to an embodiment of the present disclosure. The electronic device 700 includes at least one processor 701, a memory 702, and at least one network interface 704. The various components in the terminal device 700 are coupled together through a bus system 705. It should be understood that the bus system 705 is configured to implement connection communication among these components. The bus system 705 includes a data bus and further includes a power bus, a control bus and a state signal bus. However, for clear description, various buses are denoted as the bus system 705 in FIG. 10.

It will be understood that the memory 702 may be a volatile memory or a non-volatile memory, or may include both the volatile and non-volatile memories. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a read-only Compact Disc Read-Only Memory (CD-ROM). The magnetic surface memory may be a magnetic disk memory or a magnetic tape memory. The volatile memory may be a Random Access Memory (RAM), which functions as an external cache. By way of exemplary but not restrictive description, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Syncline Dynamic Random Access Memory (SLDRAM), a Direct Rambus Random Access Memory (DRRAM). The memory 702 described in the embodiments of the present disclosure is intended to include, but is not limited to, these and any other suitable types of memories.

The memory 702 in the embodiments of the present disclosure is used to store various types of data to support the operation of the electronic device 700. Examples of such data include any computer program for operation on electronic device 700, such as an application 7022. A program for implementing the method of the embodiments of the present disclosure may be included in the application 7022.

The method disclosed in the above embodiments of the present disclosure may be applied to or implemented by the processor 701. The processor 701 may be an integrated circuit chip having a signal processing capability. In an implementation, the operations of the above method may be performed by integrated logic circuits of hardware in the processor 701 or by instructions in the form of software. The processor 701 may be a general-purpose processor, a Digital Signal Processor (DSP), or other programmable logic devices, a discrete gate or a transistor logic device, a discrete hardware component or the like. The processor 701 may implement or perform the methods, operations and logical block diagrams disclosed in the embodiments of the present disclosure. The general-purpose processor may be a microprocessor or any conventional processor or the like. The operations of the method disclosed in connection with the embodiments of the present disclosure may be directly performed by a hardware decoding processor or performed by a combination of hardware and software modules in the decoding processor. The software module may be arranged in a storage medium in the memory 702, and the processor 701 reads the information in the memory 702 to perform the operations of the foregoing method in conjunction with hardware thereof.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components for performing the foregoing methods.

The present disclosure is described with reference to a flowchart and/or block diagram of a method, a device (system) and a computer program product according to the embodiments of the present disclosure. It is to be understood that each flow and/or block in the flow diagrams and/or block diagrams, and combinations of flow and/or block in the flow diagrams and/or block diagrams may be implemented by computer program instructions. These computer program instructions may be provided to a processor of a general-purpose computer, a special-purpose computer, an embedded processor or other programmable data processing device to produce a machine, such that the instructions executed by the processor of the computer or other programmable data processing device produce means for implementing the functions specified in one or more flows in the flowcharts and/or one or more blocks in the block diagrams.

These computer program instructions may also be stored in a computer-readable memory capable of directing a computer or other programmable data processing device to operate in a particular manner, such that the instructions stored in the computer-readable memory produce an article of manufacture including instruction means that perform the functions specified in one or more flows in the flowcharts and/or one or more blocks in the block diagrams.

These computer program instructions may also be loaded onto a computer or other programmable data processing device such that a series of operational operations are performed on the computer or other programmable device to produce a computer-implemented process, such that the instructions that execute on the computer or other programmable device provide operations for implementing the functions specified in one or more flows in the flowcharts and/or one or more blocks in the block diagrams.

It should be understood that the terms "system" and "network" in the present disclosure are used interchangeably. The term "and/or" in the present disclosure represents only an association relationship describing associated objects and represents that three relationships may exist. For example, A and/or B may represent three conditions: i.e., independent existence of A, existence of both A and B and independent existence of B. In addition, character "/" in the present disclosure usually represents that previous and next associated objects form an "or" relationship.

The foregoing description is merely illustrative of the preferred embodiments of the present disclosure, and is not intended to limit the scope of the present disclosure. Any modifications, equivalents and improvements that fall within the spirit and principles of the present disclosure fall within the scope of the present disclosure.

What is claimed is:

1. A method for controlling a discontinuous reception-onDuration timer, comprising:
    in response to switching of a terminal device from a source Band Width Part (BWP) to a target BWP, determining, by the terminal device, whether to start an onDuration timer at a starting time of the onDuration timer on the target BWP according to at least one of a monitoring result for a wake-up signal (WUS) on the source BWP or a monitoring result for a WUS on the target BWP,
    the method further comprising:
    in response to that no WUS is monitored on both of the source BWP and the target BWP, determining, by the terminal device, whether to start the onDuration timer at the starting time of the onDuration timer on the target BWP according to a configuration of a network device.

2. The method of claim 1, wherein the switching of the terminal device from the source BWP to the target BWP is within a WUS monitoring occasion on the target BWP.

3. The method of claim 2, wherein the terminal device does not monitor a WUS on the target BWP.

4. The method of claim 1, wherein the determining, by the terminal device, whether to start the onDuration timer at the starting time of the onDuration timer on the target BWP according to at least one of the monitoring result for the WUS on the source BWP or the monitoring result for the WUS on the target BWP comprises:
    in response to that a WUS is monitored on the source BWP, and the WUS instructs the terminal device to prohibit starting the onDuration timer, determining, by the terminal device, not to start the onDuration timer at the starting time of the onDuration timer on the target BWP.

5. The method of claim 1, wherein the determining, by the terminal device, whether to start the onDuration timer at the starting time of the onDuration timer on the target BWP according to at least one of the monitoring result for the WUS on the source BWP or the monitoring result for the WUS on the target BWP comprises:
    in response to no WUS is monitored on the source BWP, determining, by the terminal device, to start the onDuration timer at the starting time of the onDuration timer on the target BWP.

6. The method of claim 1, wherein the determining, by the terminal device, whether to start the onDuration timer at the starting time of the onDuration timer on the target BWP according to at least one of the monitoring result for the WUS on the source BWP or the monitoring result for the WUS on the target BWP comprises:
    in response to that a WUS is monitored on the source BWP, and the WUS instructs the terminal device to start the onDuration timer, determining, by the terminal device, to start the onDuration timer at the starting time of the onDuration timer on the target BWP.

7. The method of claim 1, wherein the switching of the terminal device from the source BWP to the target BWP is before a WUS monitoring occasion on the target BWP.

8. The method of claim 7, wherein the terminal device monitors a WUS on the target BWP.

9. The method of claim 1, wherein the determining, by the terminal device, whether to start the onDuration timer at the starting time of the onDuration timer on the target BWP according to at least one of the monitoring result for the WUS on the source BWP or the monitoring result for the WUS on the target BWP comprises:
    in response to that a WUS is monitored on either one of the source BWP and the target BWP, and the WUS instructs the terminal device to start the onDuration timer, determining, by the terminal device, to start the onDuration timer at the starting time of the onDuration timer on the target BWP.

10. A chip, comprising a processor configured to invoke and execute a computer program in a memory, to cause a device installed with the chip to perform the method for controlling the discontinuous reception-onDuration timer of claim 1.

11. A terminal device, comprising: a processor and a memory for storing a computer program executable by the processor, wherein
the processor is configured to run the computer program to:
in response to switching of the terminal device from a source Band Width Part (BWP) to a target BWP, determine whether to start an onDuration timer at a starting time of the onDuration timer on the target BWP according to at least one of a monitoring result for a wake-up signal (WUS) on the source BWP or a monitoring result for a WUS on the target BWP,
wherein the processor is further configured to run the computer program to:
in response to that no WUS is monitored on both of the source BWP and the target BWP, determine whether to start the onDuration timer at the starting time of the onDuration timer on the target BWP according to a configuration of a network device.

12. The terminal device of claim 11, wherein the switching of the terminal device from the source BWP to the target BWP is within a WUS monitoring occasion on the target BWP.

13. The terminal device of claim 11, wherein the processor is configured to run the computer program to: in response to that a WUS is monitored on the source BWP, and the WUS instructs the terminal device to prohibit starting the onDuration timer, determine not to start the onDuration timer at the starting time of the onDuration timer on the target BWP.

14. The terminal device of claim 11, wherein the processor is configured to run the computer program to, in response to no WUS is monitored on the source BWP, determine to start the onDuration timer at the starting time of the onDuration timer on the target BWP.

15. The terminal device of claim 11, wherein the processor is configured to run the computer program to, in response to that a WUS is monitored on either one of the source BWP and the target BWP, and the WUS instructs the terminal device to start the onDuration timer, determine to start the onDuration timer at the starting time of the onDuration timer on the target BWP.

16. The terminal device of claim 11, wherein the processor is configured to run the computer program to:
in response to that the network device configures the terminal device to start the onDuration timer when no WUS is monitored, determine to start the onDuration timer at the starting time of the onDuration timer on the target BWP; or
in response to that the network device configures the terminal device to prohibit starting the onDuration timer when no WUS is monitored, determine not to start the onDuration timer at the starting time of the onDuration timer on the target BWP.

17. The terminal device of claim 11, wherein the processor is configured to run the computer program to:
in response to that a WUS is monitored on one of the source BWP and the target BWP, the WUS instructs the terminal device to prohibit starting the onDuration timer, and no WUS is monitored on the other of the source BWP and the target BWP, determine not to start the onDuration timer at the starting time of the onDuration timer on the target BWP; or
in response to that a WUS is monitored on one of the source BWP and the target BWP, the WUS instructs the terminal device to prohibit starting the onDuration timer, and monitoring for the WUS is not performed on the other of the source BWP and the target BWP, determine not to start the onDuration timer at the starting time of the onDuration timer on the target BWP.

18. The terminal device of claim 17, wherein the processor is configured to run the computer program to monitor a WUS on the target BWP.

* * * * *